(12) United States Patent
Drief et al.

(10) Patent No.: US 9,010,274 B2
(45) Date of Patent: Apr. 21, 2015

(54) LIGHTWEIGHT CLUMPING ANIMAL LITTER AND METHOD THEREOF

(75) Inventors: Ahmed Drief, Pleasanton, CA (US); David M. Gall, Pleasanton, CA (US); Elisa Calimano, Pleasanton, CA (US); Aram Garabedian, Pleasanton, CA (US); Dennis B. Jenkins, Pleasanton, CA (US); Roger V. Lee, Pleasanton, CA (US); Carrier Ripberger, Pleasanton, CA (US); Sean Gooby, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 494 days.

(21) Appl. No.: 13/443,695

(22) Filed: Apr. 10, 2012

(65) Prior Publication Data

US 2012/0260860 A1    Oct. 18, 2012

Related U.S. Application Data

(60) Provisional application No. 61/474,970, filed on Apr. 13, 2011.

(51) Int. Cl.
*A01K 29/00* (2006.01)
*A01K 1/015* (2006.01)

(52) U.S. Cl.
CPC ............. *A01K 1/0154* (2013.01); *A01K 1/0155* (2013.01)

(58) Field of Classification Search
USPC .................. 119/171, 172, 173, 165; 424/76.6
See application file for complete search history.

(56) References Cited

U.S. PATENT DOCUMENTS

| | | | |
|---|---|---|---|
| 5,503,111 | A | 4/1996 | Hughes |
| 5,680,830 | A | 10/1997 | Kawaguchi et al. |
| 5,735,232 | A | 4/1998 | Lang et al. |
| 5,975,019 | A | 11/1999 | Goss et al. |
| 6,089,189 | A | 7/2000 | Goss et al. |
| 6,089,190 | A | 7/2000 | Jaffee et al. |
| 6,148,768 | A | 11/2000 | Ochi et al. |
| 6,659,042 | B2 | 12/2003 | Bloomer |
| 6,860,233 | B2 | 3/2005 | Buttersack et al. |
| 2002/0007800 | A1 | 1/2002 | Ochi |
| 2006/0027181 | A1 | 2/2006 | Ikegami et al. |
| 2008/0251027 | A1 | 10/2008 | Kirsch et al. |
| 2009/0308323 | A1 | 12/2009 | Van Nieuwenhuijzen-Van Rooijen et al. |
| 2010/0129454 | A1 | 5/2010 | Ortiz Niembro et al. |

*Primary Examiner* — Trinh Nguyen
(74) *Attorney, Agent, or Firm* — Ann Lee

(57) ABSTRACT

Animal litter having up to a sixty percent reduction in bulk density can be produced by combining flat-shaped cellulosic materials and sodium bentonite clay. Not only is the resulting litter lighter, but it also maintains a high clump strength as compared to clay-based animal litters that contain greater than ninety percent by weight sodium bentonite clay.

12 Claims, 5 Drawing Sheets

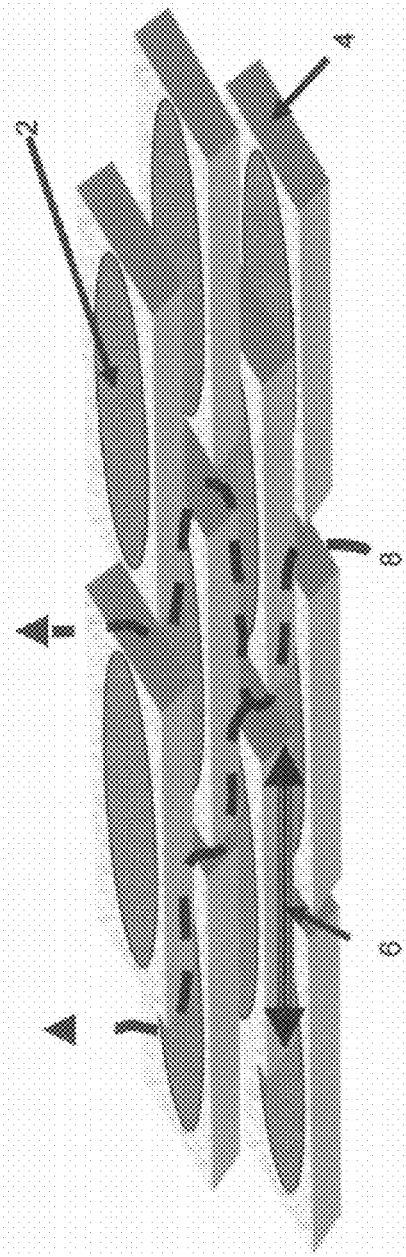
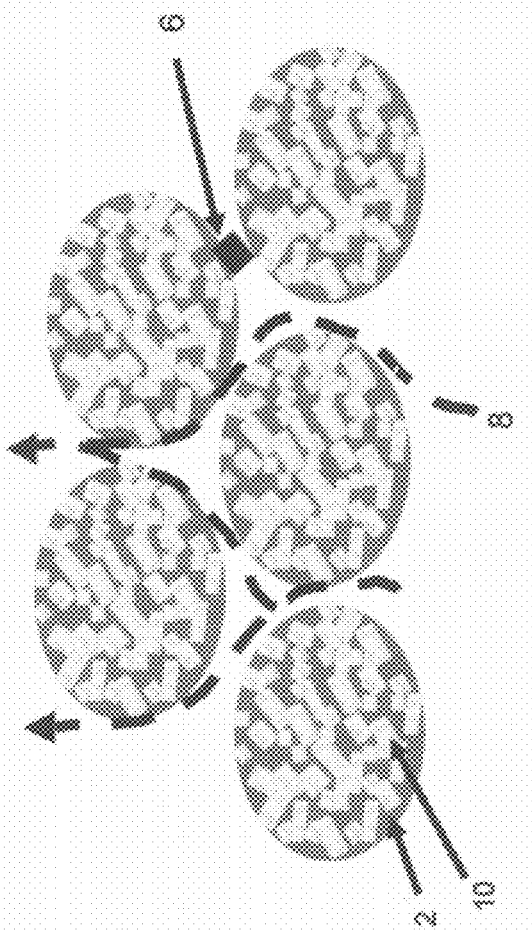
Figure 1
Figure 2

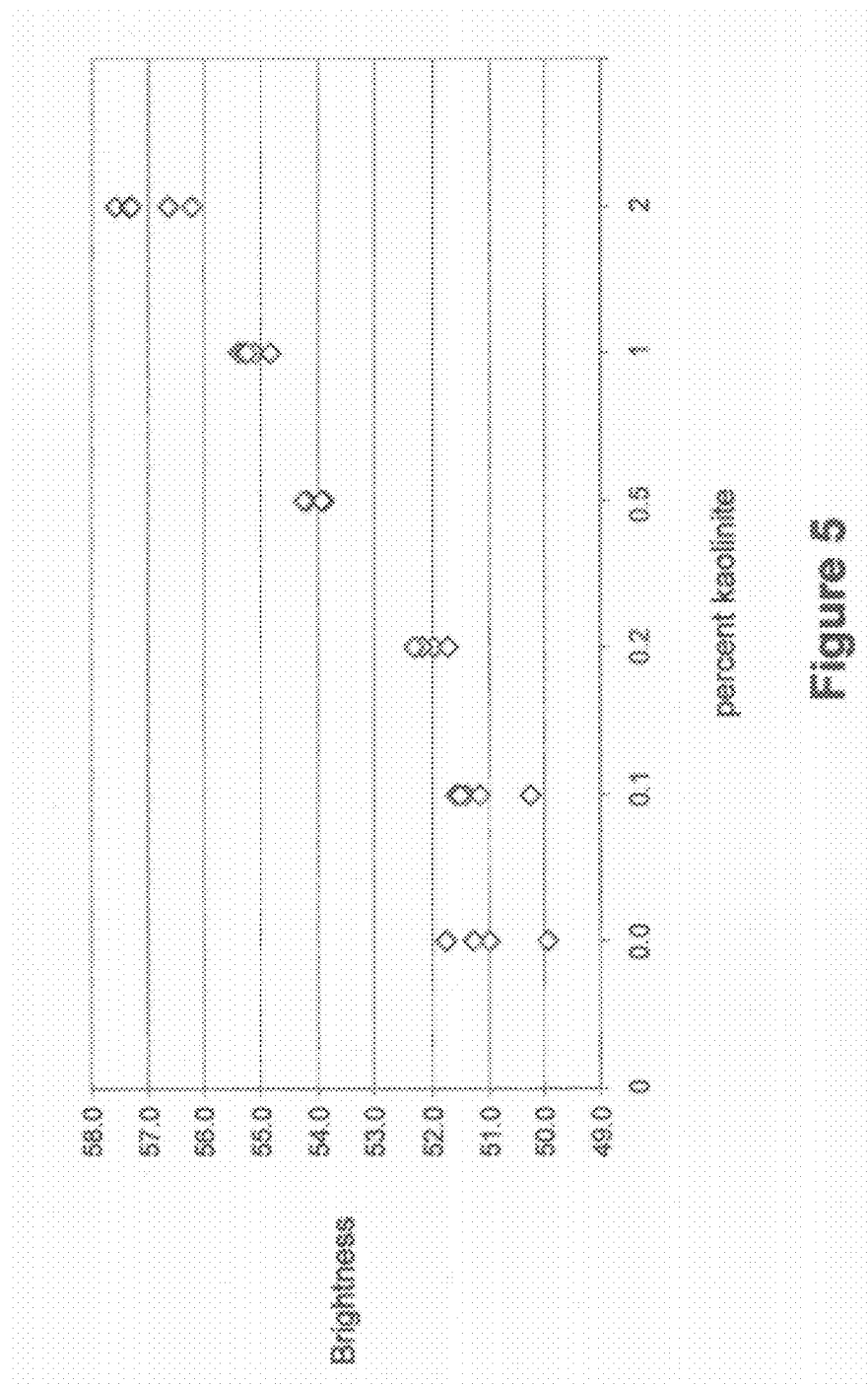

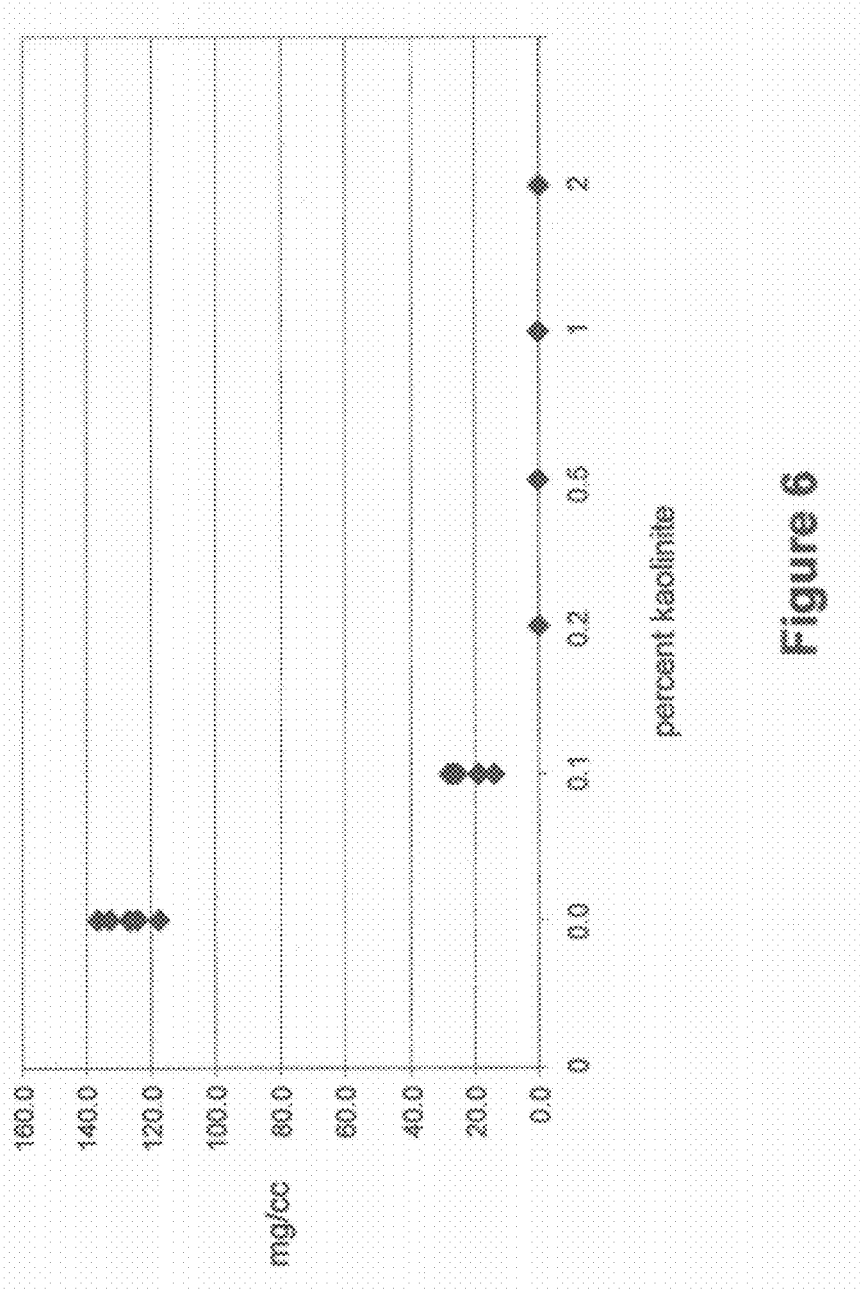

LIGHTWEIGHT CLUMPING ANIMAL LITTER AND METHOD THEREOF

THE FIELD OF THE INVENTION

Disclosed herein are lightweight clumpable animal litters. Specifically, disclosed herein are lightweight animal litters comprising composite particles of cellulosic materials and sodium bentonite that perform as well as traditional clay-based, clumping litters, yet weigh up to sixty percent less.

RELATED ART

Clay has long been used as a liquid absorbent and has found particular usefulness as an animal litter. Typically, the clay is mined, dried, and crushed to the desired particle size. Some clay litters have the ability to clump upon wetting. For example, sodium bentonite (aka Na-bentonite) is a water-swellable clay which, upon contact with moist animal waste, is able to agglomerate with other moistened sodium bentonite clay particles. The moist animal waste is contained by the agglomeration of the moist clay particles into an isolatable clump, which can be removed from the container (e.g., litter box) housing the litter. The clump strength of clay litters containing equal or greater than ninety percent sodium bentonite are strong enough to hold the clump shape upon contact with moisture and retain that shape upon scooping without pieces of the litter breaking off of the clump and remaining in the litter box, allowing waste therein to create malodors. However, sodium bentonite clay is very heavy and is mined. As such, it is a limited resource.

Another problem inherent in typical sodium bentonite clay litters is the inability to effectively control malodors. Clay has very poor odor-controlling qualities, and inevitably waste build-up leads to severe malodor production. What is needed is a lightweight animal litter with effective odor-controlling properties.

Accordingly, what is needed is an absorbent material suitable for use as an animal litter that uses less sodium bentonite, yet has clumping characteristics equivalent to clay-based litters that contain at least ninety percent sodium bentonite litters. What is further needed is a lightweight animal litter with odor-controlling properties that has clumping properties comparable to clay-based litters containing greater than ninety percent sodium bentonite, yet that requires much lower concentrations of sodium bentonite.

BRIEF DESCRIPTION OF THE DRAWINGS

FIG. 1 shows a composite particle comprising wood chip and sodium bentonite components.

FIG. 2 shows the particle to particle contact exhibited when round particles of the same size are used to form composite particles.

FIG. 5 is a graph showing the effect of varying amounts of kaolinite on the brightness measured in % reflectance of a bentonite/cellulosic/PAC composite particle animal litter.

FIG. 6 is a graph showing the effect of varying amounts of kaolinite on the static charge present on bentonite/cellulosic/PAC composite particle animal litter.

SUMMARY OF THE INVENTION

Figure 3:
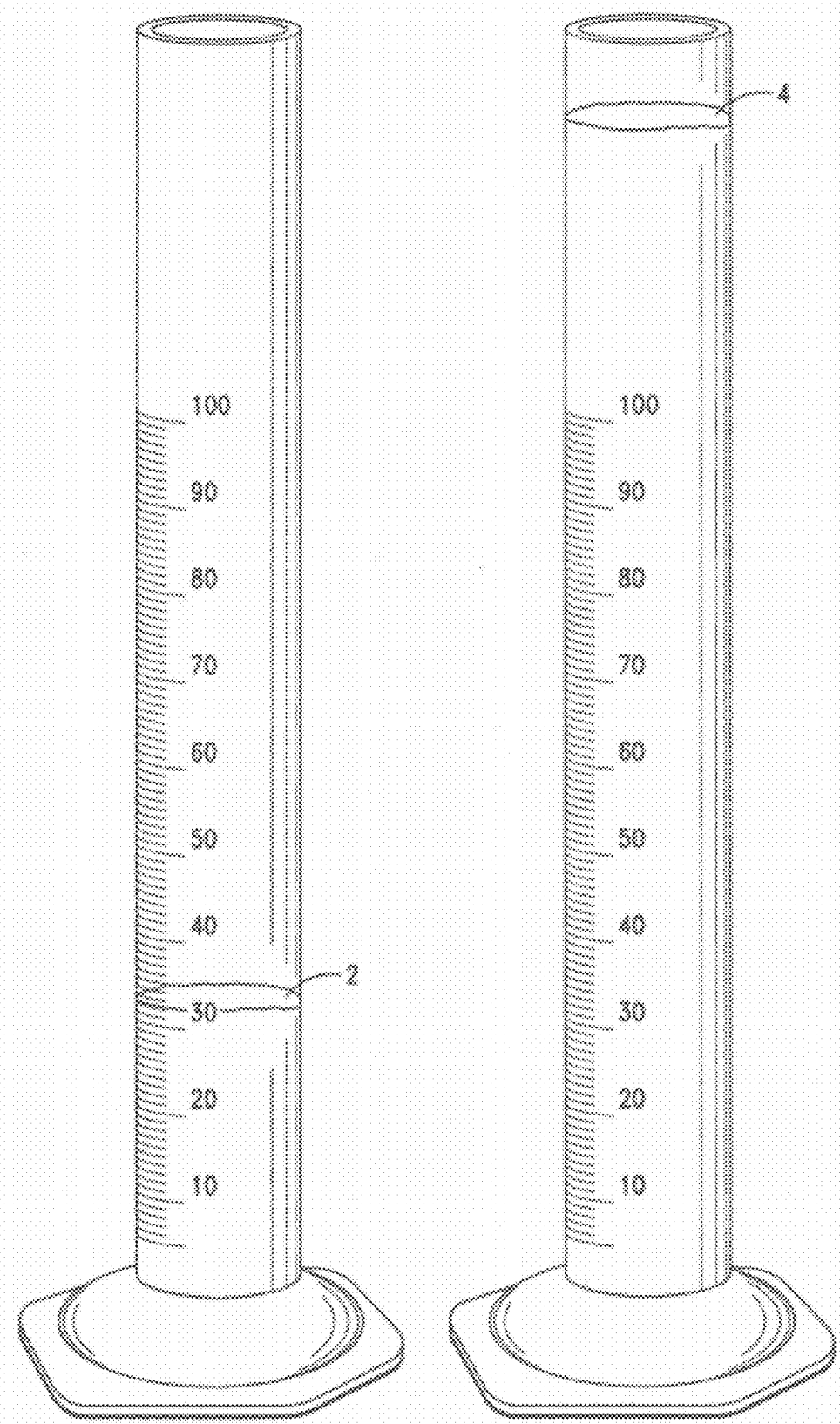
FIG. 3 shows the difference in volume between sixty percent by weight sodium bentonite and forty percent by weight wood chips.

An aspect of the invention includes composite particles comprising a flat-shaped cellulosic material component having a mean particle size in the range of about 3 mm to about 0.2 mm and an aspect ratio of at least 2 and a powdered sodium bentonite component having a mean particle size less than about 0.25 mm. The composite particles may optionally contain a spacer material having a particle size less than about 0.25 mm, such as powder activated carbon (PAC), and may optionally contain a binder material having a particle size less than about 0.25 mm, such as guar gum. The composite particles can be used alone as an animal litter and exhibit a clump strength of at least 80 percent.

Another aspect of the invention includes composite particles comprising a flat-shaped cellulosic material component having a mean particle size in the range of about 3 mm to about 0.2 mm and an aspect ratio of at least 2, a powdered sodium bentonite component having a mean particle size less than about 0.25 mm, optionally a spacer material having a mean particle size less than about 0.25 mm, such as powder activated carbon (PAC), optionally a binder material having a mean particle size less than about 0.25 mm, such as guar gum, dry blended with granular sodium bentonite, calcium bentonite, kaolinite or mixtures thereof. Dry blending the composite particles with as little as 0.2% kaolinite significantly reduces the static charge build-up on the particles and significantly reduces the dark color attributable to the presence of PAC contained in the composite particles.

A third aspect of the invention includes a method of making the composite particles having a cellulosic material component and a sodium bentonite component, the method comprising: providing flat-shaped cellulosic particles having a mean particle size in the range of about 0.2 mm to about 3 mm; providing powdered sodium bentonite particles having a mean particle size less than about 0.25 mm, wherein the ratio of cellulosic material to sodium bentonite is in the range of about 1:4 to about 4:1; using a high shear agglomeration process to mix the cellulosic particles and the sodium bentonite particles to form composite particles having a mean particle size in the range of about 0.2 mm to about 3 mm.

Detailed Description of the Preferred Embodiments

Before describing embodiments of the present invention in detail, it is to be understood that all publications, patents and patent applications cited herein, whether supra or infra, are hereby incorporated by reference in their entirety to the same extent as if each individual publication, patent or patent application was specifically and individually indicated to be incorporated by reference in its entirety.

It must be noted that, as used in this specification and the appended claims, the singular forms "a," "an" and "the" include plural referents unless the content clearly dictates otherwise. Thus, for example, reference to an "additive" includes two or more such additives.

Unless defined otherwise, all technical and scientific terms used herein have the same meaning as commonly understood by one of ordinary skill in the art to which the invention pertains. Unless otherwise stated, amounts listed in percentage ("%'s") are in weight percent.

Disclosed herein are composite absorbent particles that comprise a sodium bentonite component and a cellulosic material component. The composite absorbent particles have improved physical and chemical properties such that a lightweight litter can be produced without compromising the performance of traditional clumping clay-based litters that contain equal or greater than ninety percent sodium bentonite. Although sodium bentonite-based litters clump well, they also have disadvantages. Sodium bentonite is very heavy, relatively expensive, and not a renewable resource.

Disclosed herein are lightweight composite absorbent particles comprising between about forty and about eighty percent by weight sodium bentonite that maintain the clumping benefit of "pure sodium bentonite" (as defined herein). In preferred embodiments, a lightweight composite particle animal litter is disclosed that comprises as little as sixty percent by weight sodium bentonite, yet retains the clump strength of pure sodium bentonite litter. A high shear agglomeration process may be used to make the composite particles disclosed herein.

As used herein the term "pure sodium bentonite litter" means a clumping clay-based litter that contains equal or greater than ninety percent by weight sodium bentonite. As used herein the term "composite particle" means a discrete particle that is formed by the combination of smaller component particles. As used herein the term "PAC" means powdered activated carbon that is a fine black powder made from wood or other carbon-containing materials (e.g., coconut, coal, etc.) that have been exposed to very high temperatures in an airless environment and treated, or activated, to increase its ability to absorb by reheating with oxidizing gas or other chemicals. The result is a highly porous fine powder with a particle size less than about 0.25 mm and typically ranging from about 50 to about 150 microns. As used herein the term "flat-shaped" means a particle having a length to height to depth relationship wherein the following equation is greater than or equal to 2: (length+width)/(2×depth). As used herein the term "cellulosic material" means materials made from cellulose. Cellulose is complex carbohydrate, $(C_6H_{10}O_5)_n$, that is composed of glucose units. It forms the main constituent of the cell wall in most plants. "Cellulosic particles" are particles of cellulosic materials. Examples of cellulosic materials are discussed below. As used herein the term "clump strength" means the percentage of particles retained in the clump after three hours using the clump strength test described herein. As used herein the term "high shear agglomeration process" means a high speed, conditioning and micro-pelletizing device that converts powder into small agglomerates through the action of a high speed and the addition of water. As used herein the term "component" when used in conjunction with a composite particle means a small particle that was combined with other small particles to form a composite particle. As used herein the term "spacer material" means an agent that helps spread sodium bentonite on the surface of a cellulosic component for better distribution of the sodium bentonite during the agglomeration process. As used herein the term "binder" means a substance that causes the composite particles to better adhere to each other upon contact with a liquid, such as water or urine, to form a strong clump. Examples of binders include guar gum, starch, modified starch, natural hydrocolloids, alginates, acrylates, and polyvinyl acetate. Particle size ranges are determined by screening methods known in the art.

Cellulosic Materials

Figure 4:
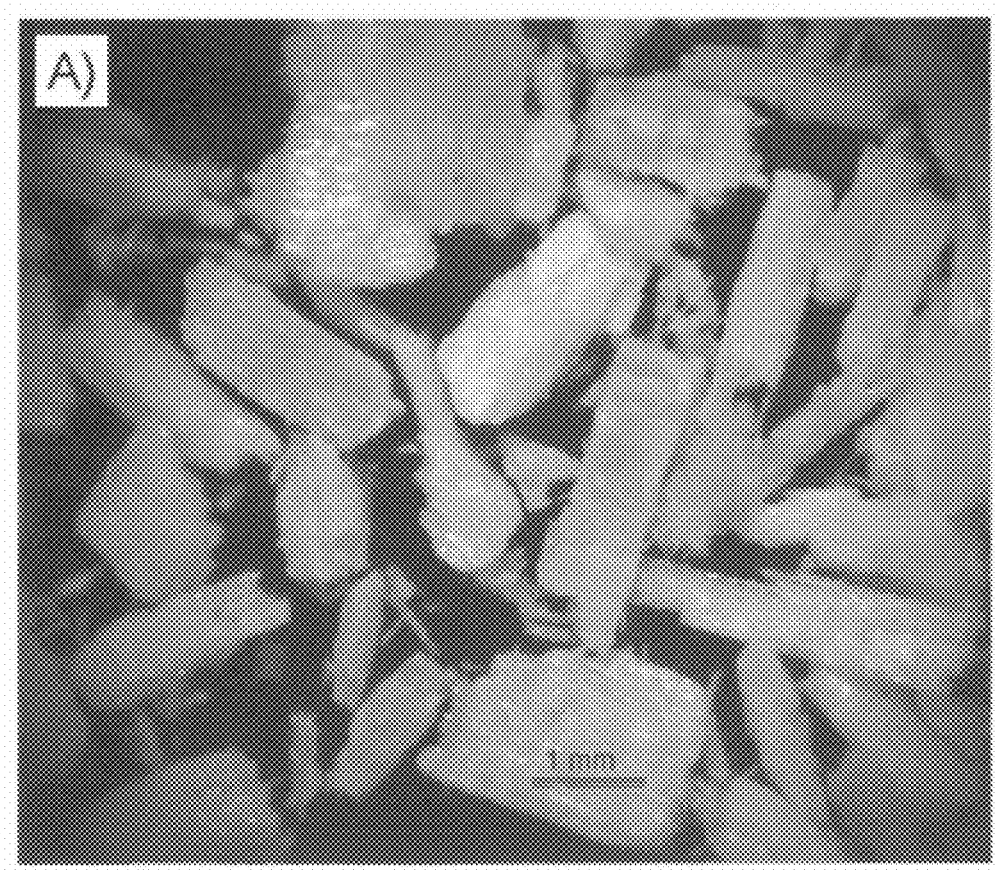
FIG. 4 is a photograph of flat-shaped wood chips.

As used herein the terms "sawdust" and "shaving(s)" mean byproducts made by fine wood particles as a result of cutting wood having a particle size ranging from about 0.2 mm to about 3 mm, and preferably ranging from about 0.7 mm to about 2 mm. Sawdust refers to particles toward the smaller end of the size range and shavings refer to particles toward the larger end of the size range. FIG. 4 is a photograph of flat-shaped sawdust and shaving particles having a mean particle size in the range of about 3 mm to about 0.2 mm and an aspect ratio of at least 2. Collectively, these are referred to as "wood chips". "Wood powder" refers to a composition of wood particles where the particles are all less than about 0.4 mm.

The surfaces of cellulosic particles, such as sawdust and shavings, whether they be derived from (wood, bark, leaves etc.), tend to be hydrophobic due to the presence of hydrophobic substances such as resin, oil and wax, contained in plants and trees. These cellulosic particles when agglomerated without clay or other hydrophilic absorbent substances may have low absorbency and therefore not ideally suited for animal litter applications.

High shear agglomeration processes, such as pin mixing, can be used to form discrete composite particles. Pin mixing is a pin-type solids processor designed for applications requiring high energy input to materials for mixing or micro-pelletizing. It is a high speed, conditioning and micro-pelletizing device that converts small particles ("components") into discrete agglomerates ("composite particles") through the action of high speed and the addition of water.

Use of a spacer material, such as activated carbon, aids in the agglomeration process by acting as an in situ pre-treatment for the cellulosic particles. Without being bound by theory, it is believed that the spacer material actually removes oil from the cellulosic particle surfaces, either by absorption or other means, thereby facilitating adequate wetting of the particle surfaces during agglomeration. Preferred spacer materials are inert, hydrophobic, and have a mean particle size no larger than (and preferably smaller than) that of the smallest component particle of the composite particle. Suitable spacer materials include, for example, powder activated carbon, sodium bicarbonate (baking soda), silica gel, activated alumina, and boron compounds and may be effective at concentrations as low as about 0.3 percent by weight of the composite particle.

Another feature common to some cellulosic materials, such as, wood chips, is that their particle structure remains well preserved during high shear agglomeration processes due to its strength and elasticity. This property differs from mineral-based absorbent particles, such as, zeolites and clays; in that mineral-based particles tend to break and disintegrate into smaller particles during high shear agglomeration processes before later binding to form composite particles. Having a particle capable of maintaining its shape enables control of the resulting shape of the composite particles with less control of the agglomeration process parameters such as the speed or the moisture target. Flat-shaped cellulosic materials having a mean particle size ranging from about 0.7 mm to about 2 mm are particularly preferred. The preferred weight percentage of flat-shaped cellulosic materials in the composite particles is between about 30 percent and about 50 percent.

Sodium Bentonite

Sodium bentonite powder having a mean particle size less than about 0.25 mm is preferred. Sodium bentonite has an affinity to bind to itself, so, aside from the benefits already discussed, the use of a spacer material can act to reduce its stickiness thereby facilitating a more even distribution of the sodium bentonite particles during the high shear agglomeration process.

Sodium bentonite expands when wet, absorbing as much as several times its dry mass in water. The main mineral that forms bentonite is Montmorillonite $((Na,Ca)_{0.33}(Al,Mg)_2(Si_4O_{10})(OH)_2.nH_2O)$. Na-montmorillonite, in particular, expands considerably more than other clays (e.g., Ca-Montmorillonite) due to water penetrating the interlayer molecular spaces and concomitant adsorption. The presence of sodium as the predominant exchangeable cation can result in the clay swelling to several times its original volume. Hence, its application in cat litters.

Adding a small amount of binder, such as guar gum, in an amount as little as 0.1 percent by weight can increase the clump strength of the resulting litter in some cases by up to ten percent. Preferred binders include guar gum, starch, polyacrylates, polysaccharides, and alginates. Guar gum ("guar") is particularly preferred because it is a powdered solid that helps form strong and rigid clumps when wet and tends to be very evenly distributed throughout the resulting composite particles. Thus, a very small amount of guar can have a considerable impact. Binders, such as guar, are known for their binding properties. They have been used in several cat litters to facilitate the adhesion between particles thus, clumping. However, none of these composite particles (e.g., wood and guar, even in much higher concentrations) could achieve the high absorption and immediate clumping of Na-bentonite. On the other hand, when mixing sodium bentonite with wood, the resulting composite particles are lightweight and strong and may or may not clump as well as pure Na-bentonite. Therefore, in some cases a binding agent may aid with clumping.

In order to achieve maximum performance the binder needs to bind to an adequate surface (e.g., a rough and solid surface). Clay, such sodium bentonite is made from several micrometric crystals that tend to disintegrate under pressure or moisture. Therefore, intermediate filler helps achieve higher binding strength. Adding cellulosic materials (e.g., wood chips), provide structural integrity to the composite particles in a manner analogous to the way re-bar strengthen concrete. A binder, such as guar, can help bind wood particles to each other and to clay. This synergy between clay, wood and binder has resulted in high clumping composite particles similar to Na-bentonite bentonite. Other suitable binders may include starches, alginates, and polysaccharides. Minimizing the amount of binder necessary is desirable because of cost.

Composite Particles

The composite particles disclosed herein comprise a flat-shaped cellulosic component having a mean particle size ranging from about 0.2 to about 3 mm (preferably about 0.7 mm to about 2 mm) in an amount ranging from about 20 percent to about 80 percent (preferably from about 40 percent to about 60 percent) by weight and a sodium bentonite component having a mean particle size less than about 0.25 mm in an amount ranging from about 20 percent to about 80 percent (preferable from about 40 percent to about 60 percent) by weight. The resulting composite particles have an interlocking structure as shown in FIG. 1 which allow for more particle to particle surface contact 6 as compared to the particle to particle contact 6 exhibited in the round particles shown in FIG. 2. Referring to FIG. 1, the combination of a flat-shaped cellulosic component 4 having a mean particle size ranging from about 0.2 mm to about 3 mm (preferably about 0.7 mm to about 2 mm) in an amount ranging from about 20 percent to about 80 percent (preferably about 40 percent to about 60 percent) by weight and a sodium bentonite component 2 having a mean particle size less than about 0.25 mm in an amount ranging from about 20 percent to about 80 percent (preferably about 40 percent to about 60 percent) by weight allows for an efficient use of the sodium bentonite so that the amount of sodium bentonite can be significantly reduced without substantially sacrificing the clump strength of the litter (see Table 5) because the contact between component particles of the composite particle is maximized. The malodor path 8 is also more restricted as compared to the malodor path 8 shown in FIG. 2.

Additionally, an amount ranging from about 0.1 to about 2 percent (preferably about 0.3 percent to about 1 percent) PAC can be included in the composite particles depicted in FIG. 1. As used herein the term "bentonite/cellulosic/PAC composites" is defined as a composite particle comprising a flat-shaped cellulosic component having a mean particle size ranging from about 0.2 mm to about 3 mm (preferably 0.7 mm to about 2 mm) in an amount ranging from about 35 to about 45 percent by weight, a sodium bentonite component having a mean particle size less than about 0.25 mm in an amount ranging from about 55 to about 65 percent by weight, a PAC component in an amount ranging from about 0.3 to about 1 percent by weight, and a guar gum component in an amount ranging from 0 percent to about 1 percent by weight.

For example, referring to FIG. 2, if a high shear agglomeration process were used to agglomerate a mineral-based material such as a zeolite 10 having a mean particle size ranging from about 0.2 mm to about 3 mm in an amount ranging from about 20 percent to about 80 percent by weight and a sodium bentonite component 2 having a mean particle size less than about 0.25 mm in an amount ranging from about 50 to about 80 percent by weight, the resulting composite particle would likely look like the composite depicted in FIG. 2 and the clump strength of the resulting composite particle would be expected to be significantly reduced compared to the clump strength of pure sodium bentonite (see Table 3). This is because, as discussed, mineral-based absorbent materials such as zeolites and clays tend to disintegrate into smaller particles during high shear agglomeration processes before later binding to form composite particles.

Still referring to FIG. 2, the same would be true if a high shear agglomeration process were used to agglomerate a cellulosic material such as a wood powder 10 having a mean particle size less than about 0.25 mm in an amount ranging from about 20 percent to about 80 percent by weight and a sodium bentonite component 2 having a mean particle size less than about 0.25 mm in an amount ranging from about 50 percent to about 80 percent by weight. The resulting composite particle would likely look like the composite depicted in FIG. 2 and the clump strength of the resulting composite particle would be expected to be significantly reduced compared to the clump strength of pure sodium bentonite (see Table 3). This is because fine cellulosic materials even when keeping the structural integrity of their shape, are the same size as the bentonite particles and the contact between component particles 6 of the composite particle is minimized. Additionally the malodor path 8 is less restricted which is expected to result in less overall odor control.

The inventors have surprisingly found that particle size of cellulosic particle contributes to the clump strength of the resulting bentonite/cellulosic/PAC composites to an even greater extent than anticipated. The inventors made two samples of bentonite/cellulosic/PAC composites by pin mixing about 50% cellulosic particles, about 48.5% sodium bentonite powder, about 0.5% guar gum and about 1% PAC. The first sample was formed from powdered cellulosic particles having a mean particle size less than about 0.4 mm, powdered sodium bentonite particles having a mean particle size less than about 0.25 mm and powdered guar gum and PAC having a mean particle size less than about 0.25 mm. The second sample was formed from wood chips having a mean particle size ranging from about 0.7 mm and about 2 mm, powdered sodium bentonite particles having a mean particle size less than about 0.25 mm and powdered guar gum and PAC having a mean particle size less than about 0.25 mm. The first sample did not clump, whereas the second sample exhibited a clump strength of about 92. Thus, the inventors concluded that the particle size of the cellulosic particles contributes significantly to the resulting clump strength of the bentonite/cellulosic/PAC composites.

Having flat-shaped cellulosic particles that retain their shape during high shear agglomeration processes and are larger than the sodium bentonite particles allows the sodium bentonite to flow evenly among the cellulosic particles which creates a resulting composite particle that has a requisite amount of porosity to allow liquid to enter the particle and disperse throughout the composite particles enabling the sodium bentonite components to interact and bind together. As discussed, the addition of spacer materials no larger in size than the sodium bentonite particles to the agglomeration process is believed to minimize the sodium bentonite's affinity to bind to itself during the agglomeration process and therefore increase the porosity of the resulting composite particle.

Additionally, without being bound by theory, it is believed that the cellulosic components take a longer time to absorb liquids than clays. It is therefore believed that the sodium bentonite absorbs liquid and holds it in close proximity to the cellulosic component such that the liquid slowly transfers or wicks to the cellulosic component. Wood is a heterogeneous, hygroscopic, cellular and anisotropic material. It is composed of cells, and the cell walls are composed of micro-fibrils of cellulose (40%-50%) and hemicellulose (15%-25%) impregnated with lignin (15%-30%). The water diffusivity of wood (the rate at which water moves from the surface to the interior of wood particles) can be reduced significantly depending on the porous structure of wood and the reactivity of its chemical components. Adding clay, such as sodium bentonite, (high water diffusivity), in contact with the surface of wood particles, increases the overall diffusivity of the resulting composite particles (clay/wood). Therefore, it is believed that sodium bentonite absorbs liquid and holds it in close proximity to the cellulosic component such that the liquid slowly transfers or wicks to the cellulosic component. The result is highly absorbent composite particles that immediately clump upon hydration similar to pure sodium bentonite clay particles.

Bulk Density Reduction can be as high as about 60% as compared to pure sodium bentonite litter. Bulk density is a property of powders, granules and other "divided" solids, especially used in reference to mineral components. It is defined as the mass of the many particles of the material divided by the total volume they occupy. The total volume includes particle volume, inter-particle void volume and internal pore volume. Bulk density is not an intrinsic property of a material; it can change depending on how the material is handled. For example, a powder poured into a cylinder will have a particular bulk density; if the cylinder is disturbed, the powder particles will move and usually settle closer together, resulting in a higher bulk density. Bulk density is a measure of the weight of the litter per unit volume (g/cc). The test method used to measure bulk density comprises a hopper with a pint container underneath. The hopper is filled with approximately 2000 cc of the sample. The gate situated at the bottom of the hopper is opened to fill the pint container with material until it overflows. The container is then leveled out using a straight edge tool and the weight is recorded. The same process is repeated twice and an average of three reps is reported (g/cc or lb/cf).

Referring to FIG. 3, a composition comprising about sixty percent by weight sodium bentonite 2 and about forty percent by weight wood chips 4 is about equal to a composition comprising only about twenty percent by volume sodium bentonite 2 and about eighty percent by volume wood chips 4. The inventors have found that pin mixing such 20:80 by volume ratio of Na-bentonite and flat-shaped wood particles with about 1% guar gum, yields a litter with a clump strength equivalent to that of pure sodium bentonite (see Table 3).

Clump strength is measured by first generating a clump by pouring 10 ml of pooled cat urine (from several cats so it is not cat specific) onto a 2 inch thick layer of litter. The urine causes the litter to clump. The clump is then placed on a half inch screen after a predetermined amount of time 3 hours has passed since the particles were wetted. The screen is agitated for 5 seconds with the arm up using a Ro-Tap Mechanical Sieve Shaker made by W.S. Tyler, Inc or other similar device. The percentage of particles retained in the clump is calculated by dividing the weight of the clump after agitation by the weight of the clump before agitation. The clump strength indicates the percentage of particles retained in the clump after 3 hours. Ideally, greater than 90%, and more ideally, greater than 95% of the particles will be retained in a clump after 3 hours upon addition of an aqueous solution, such as deionized water or animal urine. Greater than 80% particle retention in the clump is preferred.

Attrition values measure the percentage of breakage, size reduction, or fragmentation of the composite particles. ASTM method E-728 Standard Test Method for Resistance to Attrition of Granular Carriers and Granular Pesticides was used to measure attrition.

Kaolinite

One disadvantage of the bentonite/cellulosic/PAC composites disclosed herein is that they tend to be somewhat dark in color due to the carbon that is contained in the particles. The inventors have found that the color of the animal litter can be made brighter by dry blending very small amounts of kalolinte (as low as about 0.2% by weight) with the bentonite/cellulosic/PAC composites disclosed herein.

Another disadvantage of the bentonite/cellulosic/PAC composites disclosed herein is that reducing the bulk density of the litter tends to increase the tracking. The inventors observed that the composite particles tend to carry an elevated static charge as compared to pure sodium bentonite litter. This static charge leads to an undesirable amount of tracking because the static electricity causes the composite litter particles to cling to the animals' fur. The inventors have surprisingly found that the amount of static can be significantly reduced by dry blending very small amounts (as low as about 0.2% by weight) of kaolinite with the bentonite/cellulosic/PAC composites. Initially added as a whitening agent to counteract the dark color of the carbon and enhance the litter's appearance, the inventors have found that kaolinite provides an unexpected anti-static effect.

Kaolinite is a common phyllosilicate mineral. Since it is relatively inert and long lasting, kaolinite has several industrial uses. It is used as a filler for paint, rubber and plastics. However, the greatest industrial demand for kaolinite is in the paper industry to produce a glossy paper. Kaolinite's structure is composed of silicate sheets ($Si_2O_5$) bonded to aluminum oxide/hydroxide layers ($Al_2(OH)_4$) called gibbsite layers. Kaolinite forms from the alteration (mostly weathering) of aluminum rich silicate minerals such as feldspars. Kaolinite is a white clay capable of mixing with carbon and improving its appearance in cat litter.

The inventors have shown that dry blending at least about 0.2% kaolinite by weight to the bentonite/cellulosic/PAC composites disclosed herein, can significantly brighten the dark color of the bentonite/cellulosic/PAC composites when used as an animal litter. The brightness (in percent reflectance) of the animal litter was evaluated using a Minolta Chroma Meter CR-300. This device is a compact tristimulus color analyzer for measuring colors of surfaces including textured surfaces: the higher the number, the brighter the surface of the material measured. Table 1 and FIG. 5 show the effect of varying amounts of kaolinite on the brightness of a bentonite/cellulosic/PAC composite particle animal litter.

TABLE 1

| Percent | Colorimetric Results (percent reflectance) | | | | | | |
|---|---|---|---|---|---|---|---|
| Kaolinite | Sample 1 | Sample 2 | Sample 3 | Sample 4 | Sample 5 | Average | st. dev. |
| 0% | 50.0 | 51.0 | 51.3 | 51.8 | 50.0 | 50.8 | 0.81 |
| 0.1% | 51.4 | 51.2 | 50.3 | 51.6 | 51.5 | 51.2 | 0.54 |
| 0.2% | 52.0 | 52.2 | 51.7 | 52.3 | 52.3 | 52.1 | 0.26 |
| 0.5% | 54.2 | 53.9 | 53.9 | 54.3 | 54.2 | 54.1 | 0.17 |
| 1% | 55.1 | 55.4 | 55.3 | 54.8 | 55.2 | 55.2 | 0.21 |
| 2% | 56.2 | 56.6 | 57.6 | 57.4 | 57.3 | 57.0 | 0.56 |

The inventors have shown that adding at least about 0.2% kaolinite by weight to the bentonite/cellulosic/PAC composites disclosed herein, can significantly reduce the static charge present on the composite particles when used as an animal litter. As shown in Table 2 below and FIG. 6, kaolinite dry blended with the bentonite/cellulosic/PAC composites at levels as low as about 0.2% by weight significantly reduces the static charge observed. This, in turn, correlates to a significant reduction in tracking when the bentonite/cellulosic/PAC composites disclosed herein are used as an animal litter.

Static charge in animal litter was evaluated using the following test method. Bentonite/cellulosic/PAC composites (about 59% Na-bentonite, about 38% wood chips, about 1% PAC and about 0.5 guar gum) comprised the animal litter. This animal litter was used as a control (0% kaolinite). The control then was mixed with powder kaolinite at the levels mentioned in Table 2. One hundred cubic centimeters (100 cc) of each product was then poured in a one hundred cubic centimeter (100 cc) plastic container, mixed and poured out of the container by gravity. The remaining particles bound to the plastic container walls were removed manually from the container and weighed. As illustrated in Table 2 and FIG. 6, the static charge in the animal litter was completely neutralized at about 0.2% of powder kaolinite.

TABLE 2

| Percent | Amount of particles bound to the plastic jar after pouring the contents out. | | | | | | |
|---|---|---|---|---|---|---|---|
| Kaolinite | Sample 1 | Sample 2 | Sample 3 | Sample 4 | Sample 5 | Average | st. dev. |
| 0% | 124 | 133 | 117 | 127 | 136 | 127 | 7 |
| 0.1% | 14 | 18 | 26 | 25 | 28 | 22 | 6 |
| 0.2% | 0 | 0 | 0 | 0 | 0 | 0 | 0 |
| 0.5% | 0 | 0 | 0 | 0 | 0 | 0 | 0 |
| 1% | 0 | 0 | 0 | 0 | 0 | 0 | 0 |
| 2% | 0 | 0 | 0 | 0 | 0 | 0 | 0 |

Composite Particle Litter Compositions

Litter Composition A was prepared by pin-mixing 69% Na-bentonite, 30% wood chips, and 1% PAC. Litter Composition B was prepared by pin-mixing 59.5% Na-bentonite, 40% wood chips, and 0.5% PAC. Litter Composition C was prepared by pin-mixing 59.5% Na-bentonite, 39% wood chips, 1% PAC and 0.5% guar gum. Litter Composition D is a commercially available pure sodium bentonite litter (as defined herein). Litter Composition E was prepared by pin-mixing substantially spherical cellulostic particles having a particle size range less than 1 mm and sodium bentonite having a size range of less than 1 mm. Litter composition F was prepared by dry blending forty percent 8/30 mesh wood sawdust with sixty percent 8/40 mesh Na-bentonite.

The clump strength, attrition and bulk density were measured for all compositions. Bulk density reduction value is shown as compared to pure sodium bentonite litter (as defined herein). The results shown in Table 3 below are the average values from several repetitions.

TABLE 3

| Composition | Clump Strength | Attrition | Bulk Density (g/cc) | Bulk Density Reduction (%) |
|---|---|---|---|---|
| A | 90 | 1.52 | 0.62 | 42 |
| B | 80 | 0.4 | 0.53 | 51 |
| C | 95 | 1.3 | 0.48 | 56 |
| D | 92 | N/A | 1.08 | N/A |
| E | 0 (litter did not clump) | 0.54 | 0.91 | 20 |
| F | 25 | N/A | 0.38 | 65 |

Animal Litter Compositions

Although the bentonite/cellulosic/PAC composites disclosed herein, either alone or dry blended with kaolinite, are suitable for use as an animal litter, the inventors have found that using the bentonite/cellulosic/PAC composites disclosed herein as a component to an animal litter, either alone or dry blended with kaolinite as described above, yields excellent results. Combining the bentonite/cellulosic/PAC composites disclosed herein with granular clay particles results in an animal litter that exhibits excellent clump strength, odor control, bulk density reduction (BDR), tracking, color and static control. Combining the composite particles with granular clay simplifies the manufacturing process of the animal litter. The composite particles may comprise about 2 to about 65 percent by weight of the animal litter, the granular sodium bentonite may comprise about 35 to about 98 percent by weight of the animal litter, and the granular calcium bentonite may comprise 0 to about 15 percent by weight of the animal litter.

Samples were made at three different BDR levels: about 15%, about 30% and about 40%. The samples comprised the bentonite/cellulosic/PAC composites disclosed herein, granular calcium bentonite, granular sodium bentonite and optionally small amounts of litter additives such as kaolinite, borax, fragrance, etc. As used herein "granular Ca-bentonite" and "granular Na-bentonite" refer to calcium bentonite clay particles and sodium bentonite clay particles approximately 8/40 mesh (about 0.4 mm to about 2 mm).

Bentonite/cellulosic/PAC composites were prepared by pin-mixing about 60% Na-bentonite, about 40% wood chips, and about 1% PAC. No binder was included. Litter Composition G was prepared by dry blending about 5% of the bentonite/cellulosic/PAC composites by weight with about 0.1% kaolinite, about 10% by weight granular Ca-bentonite clay, and about 84% by weight granular Na-bentonite clay. Litter Composition H was prepared by dry blending about 20% the bentonite/cellulosic/PAC composites with about 0.3% kaolinite, 10% granular Ca-bentonite clay, and about 58% granular Na-bentonite clay. Litter Composition I was prepared by dry blending about 60% by weight the bentonite/cellulosic/PAC composites with about 0.3% by weight kaolinite, 10% granular Ca-bentonite clay, and about 28% by weight granular Na-bentonite clay. Table 4 compares the performance of the litter compositions G-I with the pure sodium bentonite commercial litter composition D.

TABLE 4

| Composition | Clump Strength | Dust (mg) | Bulk Density (g/cc) | Bulk Density Reduction (%) |
|---|---|---|---|---|
| G | 91 | 38 | 0.90 | 16.5 |
| H | 92 | 40 | 0.77 | 29 |
| I | 95 | 33 | 0.66 | 38.8 |
| D | 92 | 37 | 1.08 | N/A |

Table 5 shows the particle size distribution for the various samples G-I against the commercially available pure sodium bentonite litter Composition D.

TABLE 5

| Composition | \multicolumn{10}{c}{Mesh size} |
|---|---|---|---|---|---|---|---|---|---|---|

| Composition | 4 | 8 | 12 | 16 | 20 | 30 | 40 | 60 | 100 | Pan |
|---|---|---|---|---|---|---|---|---|---|---|
| G | 0.1 | 0.3 | 12 | 18 | 21 | 26 | 18 | 2.6 | 0.7 | 1.2 |
| H | 0.1 | 0.3 | 14 | 24 | 29 | 23 | 10 | 0.7 | 0.08 | 0.2 |
| I | 0.05 | 0.6 | 11 | 25 | 33 | 23 | 7 | 0.5 | 0.1 | 0.2 |
| D | 0.04 | 0.6 | 17 | 24 | 20 | 20 | 12 | 6 | 1 | 0.5 |

Two additional lightweight formulas were made and compared to two commercially available pure sodium bentonite litters. Bentonite/cellulosic/PAC composites were prepared by pin-mixing about 58% Na-bentonite, about 38% wood chips, and about 1% PAC and about 0.5% guar gum. Litter Composition J was prepared by dry blending the bentonite/cellulosic/PAC composites above with about 0.5% kaolinite and optionally minor amounts of other litter additives such as fragrance. Composition J was compared to commercially available pure sodium bentonite litter (as defined herein) Composition D.

Bentonite/cellulosic/PAC composites were prepared by pin-mixing about 58% Na-bentonite, about 38% wood chips, and about 0.5% PAC and about 0.5% guar gum. Litter Composition K was prepared by dry blending the bentonite/cellulosic/PAC composites above with about 0.5% kaolinite and optionally minor amounts of other litter additives such as fragrance. Composition K was compared to a second commercially available pure sodium bentonite litter (as defined herein) Composition L. Particle size distribution (PSD) is the range in which at least 80% of the particles fall within. Odor control is measured by the Malodor Sensory Method described below. Samples were measured on Day 7 and Day 10. Both commercially available litter compositions D and L contained fragrance. In addition to the malodor ratings, litter Compositions J and K were observed to have significantly higher fragrance scents on both day 7 and day 10 than the pure sodium bentonite commercially available litters.

Description of Malodor Sensory Method:

1. Cat boxes are filled with test litter to 3-4 inches
2. Boxes are dosed each day with urine and feces.
3. On day 7 the boxes are placed into sensory booths for evaluation.
4. The boxes are allowed to equilibrate in the closed booths for ~15 minutes before panelist evaluation.
5. The samples are then rated on a 15 point line scale by trained panelists.
6. The boxes are then scooped and re-dosed again to complete 10 days cycle of dosing.
7. On day 10 the boxes are placed into sensory booths for evaluation.
8. The boxes are allowed to equilibrate in the closed booths for ~15 minutes before panelist evaluation.
9. The samples are then rated again on a 15 point line scale by trained panelists.

TABLE 6

| Composition | Clump Strength | Dust (mg) | Odor Control (Day 7/Day 10) | PSD (mesh) | Attrition (wt. percent) | Bulk Density (g/cc) | Bulk Density Reduction (%) |
|---|---|---|---|---|---|---|---|
| J | 95 | 35 | 6/28 | 14/30 | 0.9 | 0.5 | 52 |
| D | 91 | 72 | 5/32 | 10/20 | 2.5 | 1.07 | N/A |
| K | 94 | 26 | 5/29 | 14/30 | 0.7 | 0.5 | 53 |
| L | 94 | 68 | 6/25 | 10/30 | 2.06 | 1.08 | N/A |

Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. An animal litter comprising a dry blend of:
   (i) composite particles comprising
      (a) a flat-shaped cellulosic material component having a mean particle size ranging from 0.2-3 mm and having an aspect ratio of at least 2;
      (b) a powdered sodium bentonite component having a mean particle size less than 0.25 mm, wherein the ratio of cellulosic material to sodium bentonite ranges from 1:4 to 4:1 and wherein the mean particle size of the composite particles ranges from 0.4-4 mm;
(c) optionally a spacer material, and
(d) optionally a binder;
(ii) granular sodium bentonite having a mean particle size in the range of 0.4-2 mm;
(iii) optionally granular calcium bentonite having a mean particle size in the range of 0.4-2 mm; and
(iv) at least 0.2% by weight powdered kaolinite having a particle size less than 0.25 mm; and
wherein the animal litter has a clump strength of at least 80% and is substantially free of a static charge.

2. The animal litter recited in claim 1 having a brightness of at least 52 as evaluated using a Minolta Chroma Meter CR-300.

3. The animal litter recited in claim 1 having a clump strength of at least 90% and a bulk density reduction of at least 25% as compared to pure sodium bentonite animal litter.

4. The animal litter recited in claim 1 having a clump strength of at least 95% and a bulk density reduction of at least 25% as compared to pure sodium bentonite animal litter.

5. The animal litter recited in claim 1, wherein the spacer material is selected from the group consisting of PAC, silica gel, zeolite, calcium bentonite, limestone, gypsum, kaolinite, silica, hydrophobic silica, flow aid such as talk, starches and combinations thereof.

6. The animal litter recited in claim 1, wherein the binder is selected from the group consisting of guar gum, modified starch, natural hydro-coloids, alginates, acrylates, poly vinyl acetate and combinations thereof.

7. The animal litter recited in claim 1, wherein the binder is guar gum.

8. The animal litter recited in claim 1, wherein the spacer material is powder activated carbon having a particle size less than 0.25 mm.

9. The animal litter recited in claim 1, wherein the composite particles comprise 2 percent to 65 percent by weight of the animal litter, the granular sodium bentonite comprises between 35 percent to 98 percent by weight of the animal litter, and the granular calcium bentonite comprises between 0 to 15 percent by weight of the animal litter.

10. An animal litter comprising a dry blend of:
(i) 2 percent to 65 percent by weight composite particles comprising
(a) a flat-shaped cellulosic material component having a mean particle size ranging from 0.2-3 mm and having an aspect ratio of at least 2;
(b) a powdered sodium bentonite component having a mean particle size less than 0.25 mm, wherein the ratio of cellulosic material to sodium bentonite ranges from 1:4 to 4:1 and wherein the mean particle size of the composite particles ranges from 0.4-4 mm;
(c) a spacer material comprising powder activated carbon having a particle size less than 0.25 mm;
(ii) 35 percent to 98 percent by weight granular sodium bentonite having a mean particle size in the range of 0.4-2 mm;
(iii) 0 to 15 percent by weight granular calcium bentonite having a mean particle size in the range of 0.4-2 mm; and
(iv) at least 0.2% by weight powdered kaolinite having a particle size less than 0.25 mm; and wherein the animal litter has a clump strength of at least 80% and is substantially free of a static charge.

11. The animal litter recited in claim 10, wherein the composite particles comprise 50-70 percent by weight powdered sodium bentonite, 30-50 percent by weight cellulosic particles and 0.3-1.5 percent powder activated carbon.

12. The animal litter recited in claim 10, wherein the animal litter has a percent reflectance value as measured by compact tristimulus color analyzer of at least 52.

* * * * *